US012792021B2

(12) United States Patent
Nakazawa

(10) Patent No.: US 12,792,021 B2
(45) Date of Patent: Nov. 10, 2026

(54) CONTROL DEVICE, CONTROL SYSTEM, AND CONTROL PROGRAM

(71) Applicant: Fujikoshi Machinery Corp., Nagano (JP)

(72) Inventor: Tomohito Nakazawa, Nagano (JP)

(73) Assignee: FUJIKOSHI MACHINERY CORP., Nagano (JP)

( * ) Notice: Subject to any disclaimer, the term of this patent is extended or adjusted under 35 U.S.C. 154(b) by 273 days.

(21) Appl. No.: 18/756,329

(22) Filed: Jun. 27, 2024

(65) Prior Publication Data

US 2025/0036107 A1 Jan. 30, 2025

(30) Foreign Application Priority Data

Jul. 28, 2023 (JP) ................................ 2023-123628

(51) Int. Cl.
*G05B 19/418* (2006.01)
*G06F 21/60* (2013.01)

(52) U.S. Cl.
CPC ..... *G05B 19/41845* (2013.01); *G06F 21/602* (2013.01); *G05B 2219/45031* (2013.01)

(58) Field of Classification Search
CPC .... G05B 19/41845; G05B 2219/45031; G05B 2219/32096; G05B 2219/36542; G05B 19/41865; G05B 19/418; G05B 2219/2602; G06F 21/602; H10P 72/0612; H10P 72/0604; H10P 95/00; Y02P 90/02
See application file for complete search history.

(56) References Cited

U.S. PATENT DOCUMENTS

| | | | |
|---|---|---|---|
| 2002/0055804 | A1 | 5/2002 | Betawar et al. |
| 2006/0194351 | A1 | 8/2006 | Huang et al. |
| 2010/0057239 | A1 | 3/2010 | Masuda et al. |
| 2018/0061692 | A1 | 3/2018 | Nishino et al. |

FOREIGN PATENT DOCUMENTS

| | | |
|---|---|---|
| JP | H05-94448 A | 4/1993 |

OTHER PUBLICATIONS

Extended European Search Report dated Dec. 13, 2024 in European Application No. 24190908.4.

*Primary Examiner* — Thomas K Pham

(74) *Attorney, Agent, or Firm* — Stephen J. Weyer, Esq.; Stites & Harbison, PLLC

(57) ABSTRACT

A control device for controlling operations of semiconductor wafer production devices for each of target wafers includes a storage unit, a command data generation unit, a reception data generation unit, and a communication unit, the command data generation unit associates transmission destination address with an operation recipe to generate command data representing an operation condition of one semiconductor wafer production device which is to operate or in operation, and the reception data generation unit obtains log data at a predetermined time interval from the semiconductor wafer production device via the communication unit, associate the log data with second steps of log items in series to generate reception data representing an operation state of the semiconductor wafer production device in operation or a wafer state.

9 Claims, 9 Drawing Sheets

FIG.3

WAFER 1

D2

P

| | POLISHING TIME | SURFACE PLATE ROTATIONAL TIME | HEAD ROTATIONAL SPEED | ... | HEAD PRESSURIZING FORCE |
|---|---|---|---|---|---|
| 1 | 10 | 10 | 10 | ... | 5 |
| 2 | 20 | 30 | 30 | ... | 10 |
| ... | ... | ... | ... | ... | ... |
| Q1 | 0 | 0 | 0 | ... | 0 |

D2

| | POLISHING TIME | SURFACE PLATE ROTATIONAL TIME | HEAD ROTATIONAL SPEED | ... | HEAD PRESSURIZING FORCE |
|---|---|---|---|---|---|
| 1 | 10 | 15 | 15 | ... | 10 |
| 2 | 20 | 40 | 40 | ... | 15 |
| ... | ... | ... | ... | ... | ... |
| Q1 | 0 | 0 | 0 | ... | 0 |

⋮

D2

| | POLISHING TIME | SURFACE PLATE ROTATIONAL TIME | HEAD ROTATIONAL SPEED | ... | HEAD PRESSURIZING FORCE |
|---|---|---|---|---|---|
| 1 | 10 | 20 | 20 | ... | 15 |
| 2 | 20 | 45 | 45 | ... | 20 |
| ... | ... | ... | ... | ... | ... |
| Q1 | 0 | 0 | 0 | ... | 0 |

⋮

WAFER N

D2

P

| | POLISHING TIME | SURFACE PLATE ROTATIONAL TIME | HEAD ROTATIONAL SPEED | ... | HEAD PRESSURIZING FORCE |
|---|---|---|---|---|---|
| 1 | 10 | 10 | 10 | ... | 5 |
| 2 | 20 | 30 | 30 | ... | 10 |
| ... | ... | ... | ... | ... | ... |
| Q1 | 0 | 0 | 0 | ... | 0 |

⋮

D2

| | POLISHING TIME | SURFACE PLATE ROTATIONAL TIME | HEAD ROTATIONAL SPEED | ... | HEAD PRESSURIZING FORCE |
|---|---|---|---|---|---|
| 1 | 10 | 15 | 15 | ... | 10 |
| 2 | 20 | 40 | 40 | ... | 15 |
| ... | ... | ... | ... | ... | ... |
| Q1 | 0 | 0 | 0 | ... | 0 |

FIG.5

| SECOND STEP | WAFER THICKNESS | DEVICE TEMPERATURE | DRIVE TORQUE | … | HEAD PRESSURIZING FORCE |
|---|---|---|---|---|---|
| 1 | 0.5 | 26 | 20 | … | 52 |
| 2 | 0.3 | 28 | 21 | … | 52 |
| … | … | … | … | … | … |
| Q2 | 0.05 | 33 | 25 | … | 110 |

D4

CONTROL DEVICE, CONTROL SYSTEM, AND CONTROL PROGRAM

CROSS-REFERENCE TO RELATED APPLICATION

This application is based upon and claims the benefit of priority of the prior Japanese Patent Application No. 2023-123628, filed on Jul. 28, 2023, and the entire contents of which are incorporated herein by reference.

TECHNICAL FIELD

The present invention relates to a control device, a control system, and a control program which control operations of a plurality of semiconductor wafer production devices.

BACKGROUND ART

In a semiconductor production line in which a plurality of types of semiconductor production devices are arranged, there has been known a data management method of integrally managing device driving data for driving drive units of each of the semiconductor production devices (such as a die-bonding device, a wire-bonding device, and a dispenser). In a data management method in PTL 1 (JPH05-94448A), there is proposed a method of dividing the device driving data into a plurality of files. The data management method is specifically sketched out as follows.

First, the device driving data is divided into four data files, namely a device name file of the semiconductor production devices, a unit name file of the drive units, an operation item name file for each of the drive units, and a setting data file, and is stored in a data storage unit of a managing computer independently of a data managing program. Then, a device number, a unit number, and an operation item number are read from the corresponding files, then data of a portion which coincides with the respective numbers is designated from the setting data file to perform transmission of the data to the respective semiconductor production devices and a change of the data. Thus, an increase in processing speed and an easiness in data compilation are realized.

SUMMARY OF INVENTION

Technical Problem

It is possible to apply the data management method disclosed in PTL 1 also to a semiconductor production line in which a plurality of types of, or a plurality of number of the devices (referred to as "semiconductor wafer production devices" in some cases in the present invention) in a wafer production process (including polishing, measuring, cleansing, and so on). However, in the device driving data disclosed in PTL 1, since the data management is not performed wafer by wafer, there has arisen a problem that it is unachievable to make the devices operate taking states of the wafers into consideration.

Further, in the data management method disclosed in PTL 1, since temporal changes such as deteriorations of members of the semiconductor wafer production device are not taken into consideration, there has also arisen another problem that it is unachievable to perform the data management based on the temporal changes.

Solution to Problem

The present invention is made in view of the circumstance described above, and has an object of providing a control device, a control system, and a control program which control operations of the plurality of semiconductor wafer production devices, and the control device, the control system, and the control program which are capable of performing the data management taking the states of the wafers and the temporal changes of the devices into consideration.

The present invention solves the problems described above with such a solution as described below as an embodiment.

A control device configured to control operations of a plurality of semiconductor wafer production devices for each of target wafers is required to include a storage unit, a command data generation unit, a reception data generation unit, and a communication unit, wherein the storage unit is required to store a first configuration file, a setting value file, and a second configuration file, the first configuration file is required to store a first identifier of the semiconductor wafer production devices, a second identifier of the wafers, operation items of the semiconductor wafer production device, a number of first steps of the operation items, and transmission destination addresses associated with the operation items and the first steps, the setting value file is required to store an operation recipe which is associated with the first identifier and the second identifier, the operation items, and the first step, and which represents an operation condition for each of the semiconductor wafer production devices, or an operation recipe which is associated with the second identifier, the operation items, and the first step, and which represents the operation condition for each of the semiconductor wafer production devices, the second configuration file is required to store the first identifier, the second identifier, log items of the semiconductor wafer production device, a number of second steps of the log items, a predetermined time interval, and reception source addresses associated with the log items, the command data generation unit is required to have a configuration which associates the transmission destination addresses and the operation recipe with each other to generate command data representing an operation condition of one of the semiconductor wafer production devices which is to operate, or is in operation, and which outputs the command data from the communication unit to the one of the semiconductor wafer production devices, and the reception data generation unit is required to have a configuration which obtains log data from one of the semiconductor wafer production devices via the communication unit at the predetermined time interval, which associates the log data with the second step in sequence to generate reception data representing at least one of an operation state of the one of the semiconductor wafer production devices in operation, and a state of the wafer, and which stores the reception data in the storage unit.

Further, it is preferable that the first configuration file and the second configuration file are encrypted by predetermined encryption processing.

Further, it is preferable that the first configuration file and the second configuration file are subjected to a predetermined protection processing of inhibiting at least one of deletion and rewriting.

Further, a control system configured to control operations of a plurality of semiconductor wafer production devices for each of target wafers is required to include a control device including a command data generation unit, a reception data generation unit, and a communication unit, and a storage unit, wherein the storage unit is required to store a first configuration file, a setting value file, and a second configuration file, the first configuration file is required to store a first identifier of the semiconductor wafer production devices, a second identifier of the wafers, operation items of the semiconductor wafer production device, a number of first steps of the operation items, and transmission destination addresses associated with the operation items and the first steps, the setting value file is required to store an operation recipe which is associated with the first identifier and the second identifier, the operation items, and the first step, and which represents an operation condition for each of the semiconductor wafer production devices, or an operation recipe which is associated with the second identifier, the operation items, and the first step, and which represents the operation condition for each of the semiconductor wafer production devices, the second configuration file is required to store the first identifier, the second identifier, log items of the semiconductor wafer production device, a number of second steps of the log items, a predetermined time interval, and reception source addresses associated with the log items, the command data generation unit is required to have a configuration which associates the transmission destination addresses and the operation recipe with each other to generate command data representing an operation condition of one of the semiconductor wafer production devices which is to operate, or is in operation, and which outputs the command data from the communication unit to the one of the semiconductor wafer production devices, and the reception data generation unit is required to have a configuration which obtains log data from one of the semiconductor wafer production devices via the communication unit at the predetermined time interval, which associates the log data with the second step in sequence to generate reception data representing at least one of an operation state of the one of the semiconductor wafer production devices in operation, and a state of the wafer, and which stores the reception data in the storage unit.

Further, it is preferable that the first configuration file and the second configuration file are encrypted by predetermined encryption processing.

Further, it is preferable that the first configuration file and the second configuration file are subjected to a predetermined protection processing of inhibiting at least one of deletion and rewriting.

Further, a control program which is computer-readable and which is configured to control operations of a plurality of semiconductor wafer production devices for each of target wafers, is required to make a computer execute processing including command data generation processing of associating a first identifier of the semiconductor wafer production devices, a second identifier of the wafers, operation items of the semiconductor wafer production device, and transmission destination addresses associated with first steps of the operation items with an operation recipe which is associated with the first identifier and the second identifier, the operation items, and the first steps, and which represents an operation condition for each of the semiconductor wafer production devices, or an operation recipe which is associated with the second identifier, the operation items, and the first steps, and which represents an operation condition for each of the semiconductor wafer production devices to generate command data representing an operation condition of one of the semiconductor wafer production devices which is to operate or is in operation, command data output processing of outputting the command data from a communication unit to the one of the semiconductor wafer production devices, reception data generation processing of obtaining log data at a predetermined time interval from one of the semiconductor wafer production devices via the communication unit, and associating the log data with second steps of log items in sequence to generate reception data representing at least one of an operation state of the one of the semiconductor wafer production devices in operation, and a state of the wafer, and reception data storage processing of storing the reception data in the storage unit.

Further, it is preferable that the first configuration file and the second configuration file are encrypted by predetermined encryption processing.

Further, it is preferable that the first configuration file and the second configuration file are subjected to a predetermined protection processing of inhibiting at least one of deletion and rewriting.

Advantageous Effects of Invention

According to the configuration described above, it is possible to generate the command data taking the state of the wafers into consideration and then transmit the command data to the plurality of semiconductor wafer production devices. Further, according to the configuration described above, it is possible to obtain the log data for each of the wafers and devices from the plurality of semiconductor wafer production devices, and then generate the reception data based on the log data. Further, by performing both the generation of the command data and the generation of the reception data, it is possible to realize the semiconductor production line capable of performing the data management taking states of the wafers and the temporal change in the devices into consideration.

BRIEF DESCRIPTION OF DRAWINGS

FIG. 3 is an explanatory diagram illustrating a data structure of a setting value file according to the embodiments of the invention.

FIG. 5 is an explanatory diagram illustrating a data structure of reception data according to the embodiments of the invention.

DESCRIPTION OF EMBODIMENTS

Figure 1:
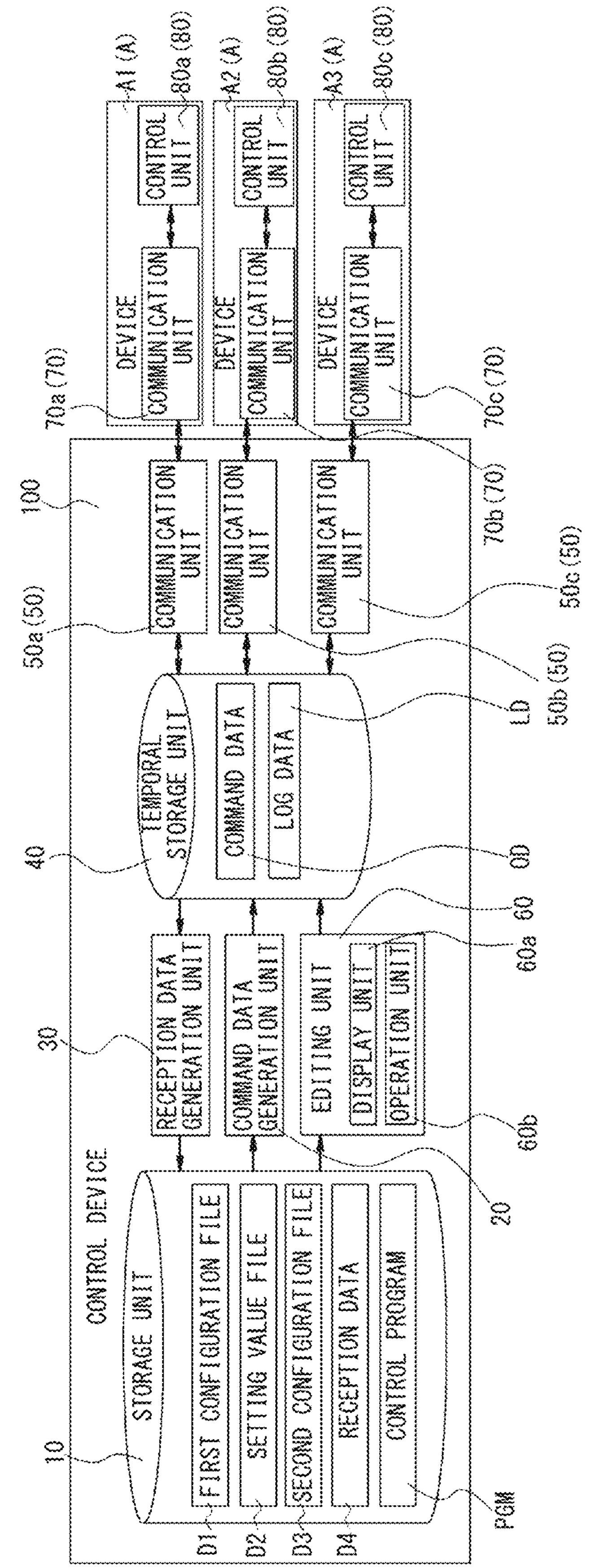
FIG. 1 is a block diagram of a control device according to a first embodiment of the invention.
Figure 2:
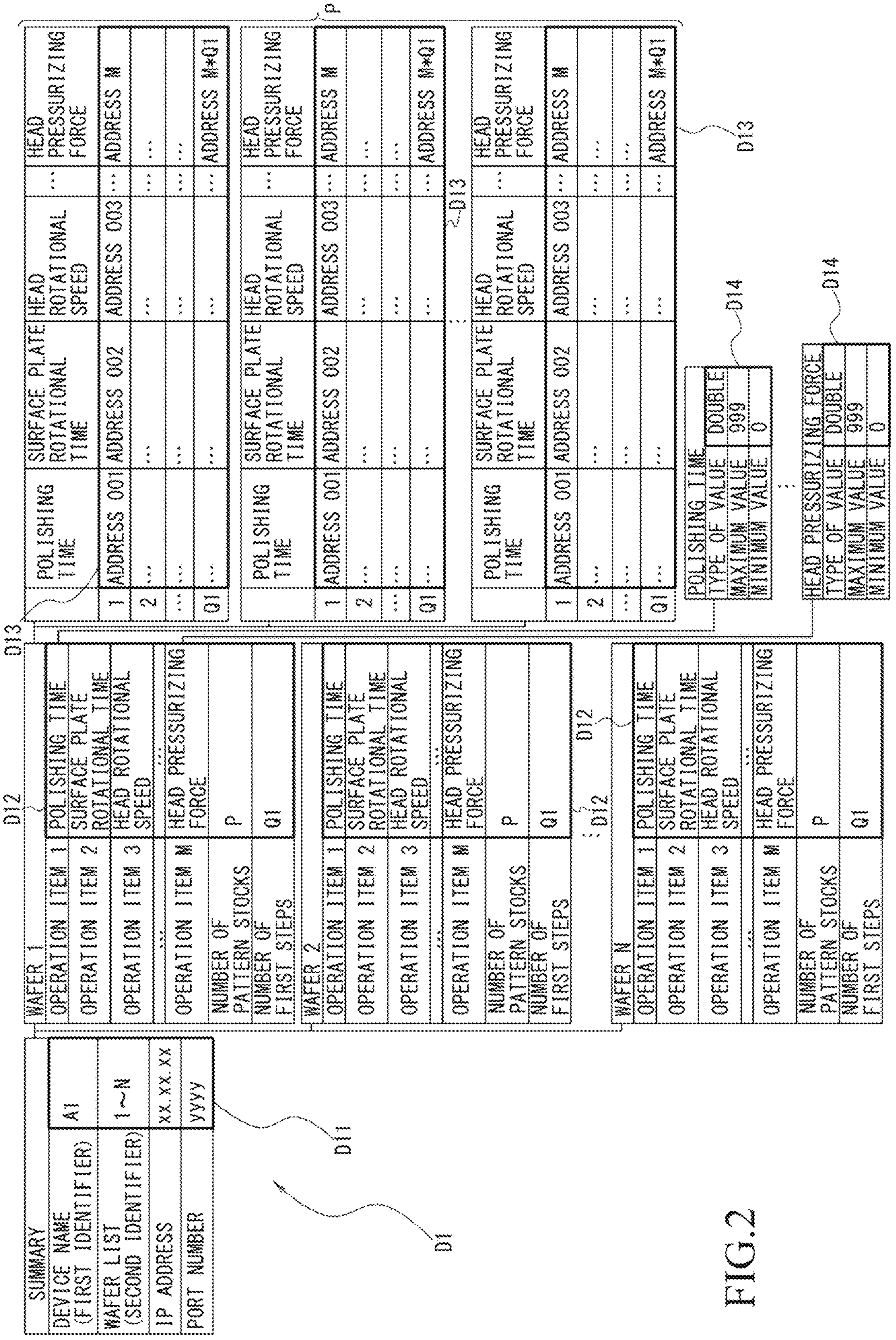
FIG. 2 is an explanatory diagram illustrating a data structure of a first configuration file according to embodiments of the invention.
Figure 4:
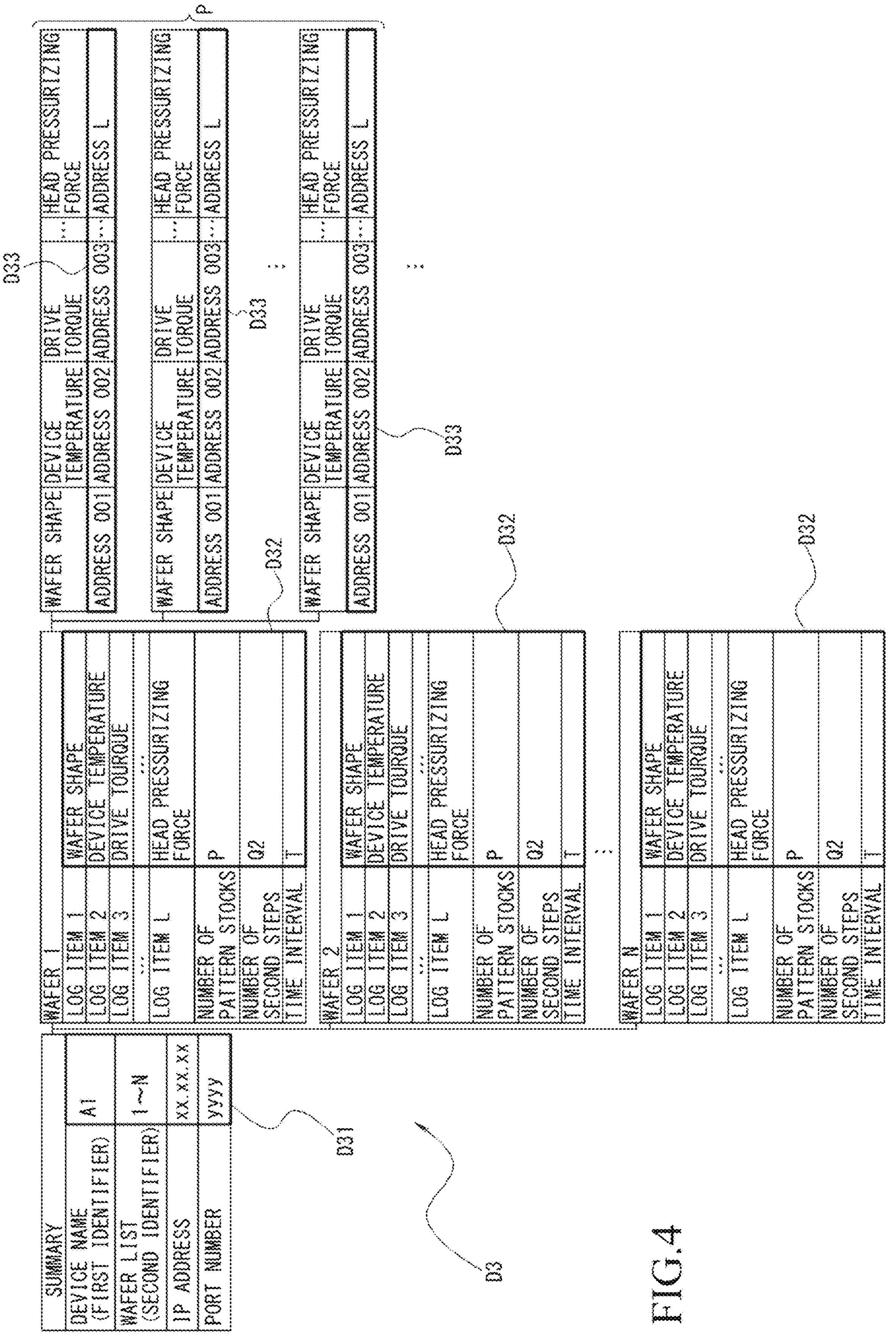
FIG. 4 is an explanatory diagram illustrating a data structure of a second configuration file according to the embodiments of the invention.
Figure 6:
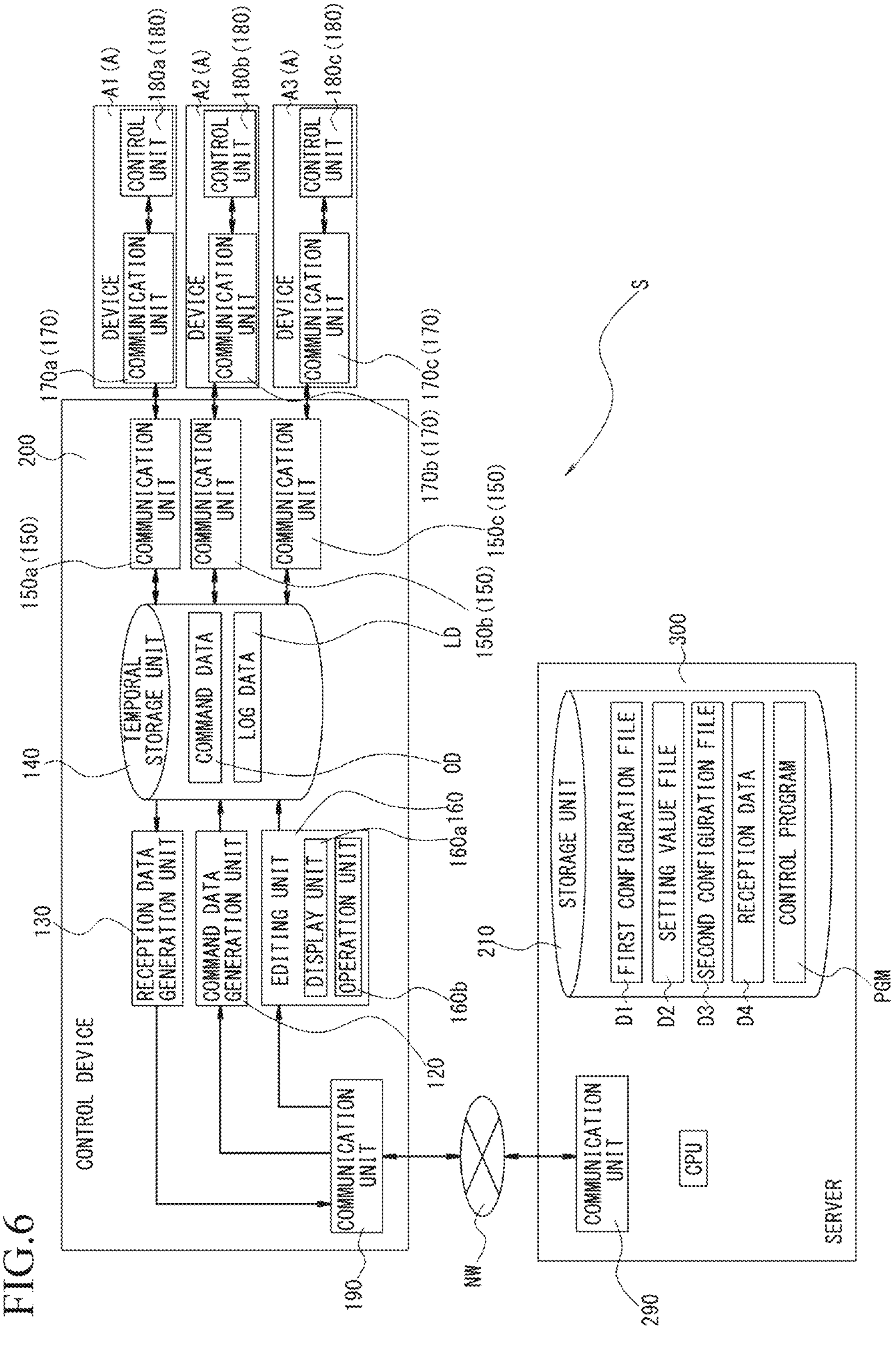
FIG. 6 is a block diagram of a control system according to a second embodiment of the invention.

Some embodiments of the invention will hereinafter be described in detail with reference to the drawings. FIG. 1 is a block diagram of a control device 100 according to the first embodiment of the invention. FIG. 2 is an explanatory diagram illustrating a data structure of a first configuration file D1 according to the embodiments of the invention. FIG. 3 is an explanatory diagram illustrating a data structure of a setting value file D2 according to the embodiments of the invention. FIG. 4 is an explanatory diagram illustrating a data structure of a second configuration file D3 according to the embodiments of the invention. FIG. 5 is an explanatory diagram illustrating a data structure of reception data D4 according to the embodiments of the invention. FIG. 6 is a block diagram of a control system S according to a second embodiment of the invention. It should be noted that in all the drawings for describing the embodiments, members having the same function are denoted by the same reference symbol, and redundant description thereof will be omitted in some cases.

(Semiconductor Wafer Production Device)

First, the semiconductor wafer production device A according to the invention includes devices in an anterior process for manufacturing wafers out of processes broadly classified into the anterior process and a posterior process for manufacturing chips. Specifically, a cutting device for cutting the wafers out from an ingot, a polishing apparatus (a single-sided polishing apparatus, a double-sided polishing apparatus, an edge polishing apparatus, and so on) for polishing a surface and an end edge of the wafer, a sputtering device for forming a film on a surface of the wafer, and so on are included. Further, besides these, a cleansing device for the wafers, a variety of types of measurement devices, a variety of types of inspection devices, and so on are also included. It should be noted that as an example of the semiconductor wafer production devices A according to the embodiments, there is assumed a single-sided polishing apparatus A which is known to the public, and which includes a surface plate an upper surface of which is attached with a polishing pad, and a polishing head capable of holding the wafer. Therefore, regarding the first configuration file D1, the setting value file D2, the second configuration file D3, the reception data D4, command data OD, and log data LD, those including a variety of parameters with respect to the single-sided polishing apparatus A will be illustrated by example.

Further, the semiconductor wafer production devices (the single-sided polishing apparatuses) A according to the first embodiment are provided with communication units 70 (70*a* through 70*c*) and control units 80 (80*a* through 80*c*), and each have a configuration of making the units of the device operate based on input of the command data OD. The semiconductor wafer production devices (the single-sided polishing apparatuses) A according to the second embodiment are provided with communication units 170 (170*a* through 170*c*) and control units 180 (180*a* through 180*c*), and each have a configuration of making the units of the device operate based on input of the command data OD.

Further, in the control device 100, the control system S, and a control program PGM according to the invention, there is described when three semiconductor wafer production devices (the single-sided polishing apparatuses) A1 through A3 are disposed, but the number of the semiconductor wafer production devices A is not limited thereto. It should be noted that it is possible to adopt when the plurality of types of semiconductor wafer production devices A described above is disposed.

First Embodiment (Control Device)

Subsequently, an overall configuration of the control device 100 according to the first embodiment will be described. The control device 100 is realized by an information processing device such as a personal computer or a workstation as an example. In other words, the control device 100 is configured including a CPU, a memory such as a RAM or a ROM, and a communication unit, and operates based on the control program PGM set in advance, and a setting signal input from an editing unit 60.

Further, as shown in FIG. 1, the control device 100 according to the present embodiment is provided with a storage unit 10, a command date generation unit 20, a reception data generation unit 30, a temporal storage unit 40, one or more communication units 50, and the editing unit 60. The control device 100 is provided with three communication units 50*a* through 50*c* in order to control the three single-sided polishing apparatuses A1 through A3.

Then, the storage unit 10 related to the present embodiment corresponds to the ROM which is a nonvolatile memory as an example. In the storage unit 10, there are stored the first configuration file D1, the setting value file D2, the second configuration file D3, and the control program PGM for making the command data generation unit 20 and the reception data generation unit 30 execute the operation as the control device 100. Further, the reception data D4 described later is also stored in the storage unit 10.

Further, the command data generation unit 20 related to the present embodiment corresponds to a CPU, and is a configuration which calls the control program PGM from the storage unit 10 to sequentially execute processing of generation of the command data OD and processing of output of the command data OD.

Further, the reception data generation unit 30 related to the present embodiment corresponds to a CPU, and is a configuration which calls the control program PGM from the storage unit 10 to sequentially execute processing of generation of the reception data D4 and processing of storing the reception data D4 into the storage unit 10.

Further, the temporal storage unit 40 related to the present embodiment corresponds to the RAM which is a volatile memory as an example. The temporal storage unit 40 is a configuration of temporarily storing the command data OD generated by the command data generation unit 20, and the log data LD received by the communication units 50 (50*a* through 50*c*) described later.

Further, the communication units 50 (50*a* through 50*c*) related to the present embodiment have functions of performing predetermined communication (transmission or reception of data) through a wired LAN or a wireless LAN with the respective communication units 70 (70*a* through 70*c*) of the semiconductor wafer production devices A (A1 through A3).

It should be noted that the control device 100 may be a configuration including a single communication unit 50 common thereto.

Further, the editing unit 60 related to the present embodiment is a configuration including a display unit 60*a* and an operation unit 60*b*. The display unit 60*a* is a display for displaying the files D1 through D3 stored in the storage unit 10. Further, the operation unit 60*b* may be a touch panel besides a mouse and a keyboard as an example. Due to the editing unit 60, it is possible for the operator to edit the setting value file D2.

Subsequently, the first configuration file D1 and the setting value file D2 related to the present embodiment will be described in detail.

(First Configuration File)

The first configuration file D1 related to the present embodiment has a data structure which stores a first identifier for identifying the semiconductor wafer production device A, a second identifier for identifying the wafers, operation items of the semiconductor wafer production device A, the number Q1 of first steps of the operation items, and transmission destination addresses associated with the operation items and the first steps. More specifically, as shown in FIG. 2, the first configuration file D1 has a data structure including summary data D11, wafer data D12 in a hierarchy below the summary data D11, transmission destination address data D13 in a hierarchy below the wafer data D12, and definition data D14 in the hierarchy below the wafer data D12.

The summary data D11 has a data structure having elements including a device name (the first identifier), a wafer list (the second identifier), an IP address, and a port number. More particularly, there is adopted the data structure in which the summary data D11 stores the single first identifier, and the second identifiers associated with the first identifier. In other words, the storage unit 10 stores the first configuration files D1 as much as the number of the semiconductor wafer production devices A. It should be noted that the IP address and the port number are for identifying the transmission destination to the semiconductor wafer production device A.

Further, the wafer data D12 has a data structure which is divided into N wafers, and which has elements including the operation items classified into M, the number P of pattern stocks, and the number Q1 of the first steps. It should be noted that the operation items are items representing operations of units of the semiconductor wafer production device A, and in the case of the single-sided polishing apparatus A, the items include polishing time, a surface plate rotational speed, a head rotational speed, head pressurizing force, and so on. Further, the pattern stocks correspond to a variety of operations of each of the semiconductor wafer production devices A, and in the case of the single-sided polishing apparatus A, the number P of the pattern stocks is three, that is the pattern stocks include coarse polishing, medium polishing, and final polishing, as an example. Further, the number Q1 of the first steps is the number which defines how many steps the operation of the semiconductor wafer production device A is performed in. It should be noted that when the operation items include time (the polishing time in the present embodiment), there is adopted the configuration in which each of the steps operates for the time (the polishing time).

Further, when the plurality of wafers (five wafers as an example) is processed (including processing, inspection, and cleansing) at a time as a single batch, it is possible to adopt a configuration in which the wafer data D12 is divided into N batches instead of being divided into N wafers. As an example, the semiconductor wafer production device A is a polishing apparatus (a single-sided polishing apparatus or a double-sided polishing apparatus) A which is capable of polishing a plurality of wafers at the same time.

Further, the transmission destination address data D13 has a data structure which is divided into N wafers, and which has elements including the transmission destination addresses for each of the P pattern stocks, each of the Q1 first steps, and each of the M operation items. More specifically, the transmission destination addresses are stored in each of Q1×M matrixes, and the transmission destination address data D13 has a data structure having P pieces of the Q1×M matrix data.

Further, the definition data D14 has a data structure which is divided into the N wafers, and has elements including a type, a maximum value, and a minimum value of each of the M operation items. As an example, the definition data D14 is referred to when the editing unit 60 edits the setting value file D2.

The first configuration file D1 has the hierarchical data structure as described above, but may be divided into the data D11 through D14.

(Setting Value File)

Then, the setting value file D2 related to the present embodiment has a data structure having elements including operation recipes which are associated with the first identifier, and second identifier, the operation items, and each of the first steps, and which represent operation conditions for each of the semiconductor wafer production devices. More specifically, as shown in FIG. 3, the setting value file D2 has the file name classified by the second identifier, and has a data structure in which the operation recipes are stored in each of the Q1×M matrixes so as to be associated with the second identifier, and P pieces of the Q1×M matrix data (a CSV file as an example) are included. By adopting the configuration described above as the setting value file D2, it is possible to use the setting value file D2 in common to the devices A the same in type.

It should be noted that when the setting value file D2 is a CSV file, as an example, the CSV file includes the first identifier and the second identifier, or the second identifier alone, in the file name, but may have such a data structure in which the first identifier and the second identifier, or the second identifier alone, is included in an upper hierarchy as in the first configuration file D1.

By each of the files D1, D2 having the files for the respective semiconductor wafer production devices A and the respective wafers, it is possible to generate the command data OD for each of the wafers, and output the command data OD to the plurality of semiconductor wafer production devices A with a single control device (computer) 100. Further, by making the first configuration file D1 and the setting value file D2 separate from each other, for example, it becomes easy for the editing unit 60 to edit the operation recipes.

(Command Data Generation Unit)

Subsequently, specific processing in the command data generation unit 20 will be described in detail.

The command data generation unit 20 is a configuration (command data generation processing) which associates the transmission destination addresses and the operation recipes stored in the setting value file D2 with each other based on the first configuration file D1 to generate the command data OD representing the operation conditions of one of the semiconductor wafer production devices A which is going to operate, or is in operation. Specifically, the command data generation unit 20 generates the command data OD based on a type of the wafer set in advance, a type of the semiconductor wafer production device A set in advance, and a type of the pattern stock which is set in advance, and which corresponds to the operation pattern of the semiconductor wafer production device A. More specifically, it is assumed when performing surface polish of one wafer with one pattern using the single-sided polishing apparatus A1. The command data generation unit 20 reads the transmission destination address data D13 and the setting value file D2 which correspond to the single-sided polishing apparatus A1, the wafer, and the pattern, from the storage unit 10. Then, the command data generation unit 20 associates the elements of the transmission destination address data D13 with the elements of the setting value file D2 corresponding to (i.e., at the same row and the same column in) the matrix of the elements to generate the command data OD, and then stores the command data OD in the temporal storage unit 40. Subsequently, the command data generation unit 20 outputs the command data OD to the communication unit **70*a* from the temporal storage unit 40 via the communication unit 50***a* (command data output processing). Since each of the operation recipes in the command data OD is associated with the transmission destination address, the operation recipes are output to the respective control unit 80 (80*a*) of the single-sided polishing apparatus A1, and it is possible to perform predetermined surface polish (an operation of the semiconductor wafer production device A).

(Second Configuration File)

Subsequently, the second configuration file D3 related to the present embodiment will be described in detail.

The second configuration file D3 related to the present embodiment has a data structure having elements including the first identifier, the second identifier, log items of the semiconductor wafer production device, the number Q2 of second steps of the log items, a predetermined time interval T, and reception source addresses associated with the log items. More specifically, as shown in FIG. 4, the data structure includes summary data D31, wafer data D32 in a hierarchy below the summary data D31, and reception source address data D33 in a hierarchy below the wafer data D32.

The summary data D31 is substantially the same in data structure as the summary data D11. Specifically, the first identifier of one semiconductor wafer production device A alone is stored in the summary data D31, and a corresponding number of second configuration files D3 to the number of the semiconductor wafer production devices A are stored in the storage unit 10.

The wafer data D32 has a data structure which is divided into N wafers, and which has elements including the log items classified into L, the number P of the pattern stocks, the number Q2 of the second steps, and the predetermined time interval T. It should be noted that the log items are items (i.e., the items of the log data LD) representing at least one of items of a variety of types of measurement during the semiconductor wafer production device A is in operation or after the operation is terminated (including a state in which the semiconductor wafer production device A is stopped, and a state after the semiconductor wafer production device A is stopped), and items of a variety of types of measurement of a wafer during the semiconductor wafer production device A is in operation or after the operation is terminated (including a state in which the semiconductor wafer production device A is stopped, and a state after the semiconductor wafer production device A is stopped), and include a wafer shape (e.g., a thickness of the wafer), a device temperature, a drive torque, and head pressurizing force, as an example, in the case of the single-sided polishing apparatus A. Further, the number Q2 of the second steps is the number which defines how many steps the measurement of the semiconductor wafer production device A is performed in. Further, the reception data generation unit 30 obtains the log data LD which is communicated in real time when the semiconductor wafer production device A is in operation at the time interval T. In other words, the second step is separated by the predetermined time interval T.

Further, the reception source address data D33 has a data structure which is divided into N wafers, and which has elements including the P pattern stocks and the reception source address for each of the L log items. Unlike the first configuration file D1, the second configuration file D3 has a data structure having P reception source address data D33 in which L reception source addresses are stored.

As described above, the second configuration file D3 has the hierarchical data structure as described above, but may be divided into the data D31 through D33.

(Reception Data Generation Unit)

Subsequently, specific processing in the reception data generation unit 30 will be described in detail.

The reception data generation unit 30 obtains the log data LD at the predetermined time interval T from one semiconductor wafer production device A via the communication units 50 (50*a* through 50*c*), and associates the log data LD and the second steps with each other in sequence to generate the reception data D4 representing at least one of the operation state of one semiconductor wafer production device A in operation out of the semiconductor wafer production devices A, and the state of one wafer in operation in the semiconductor wafer production device A (reception data generation processing). Further, the reception data generation unit 30 is a configuration (reception data storage processing) of storing the reception data D4 in the storage unit 10. More specifically, it is assumed when performing the surface polish of one wafer with one pattern using the single-sided polishing apparatus A1. The reception data generation unit 30 reads the second configuration file D3 from the storage unit 10. Further, the reception data generation unit 30 reads the log data LD stored in the temporal storage unit 40 at the predetermined time interval T. Then, the reception data generation unit 30 associates the log data LD at the time interval T and the second steps with each other in sequence based on the reception source address data D33 to generate such reception data D4 in Q2×(L+1) matrix as shown in FIG. 5. It should be noted that each of the rows represents a time-series order (i.e., an order of the second steps) in which the log data LD is read. Then, the reception data D4 thus generated is stored in the storage unit 10.

It should be noted that it is sufficient for each of the rows of the reception data D4 to be the order (the order of the second steps) in which the log data LD is read at the predetermined time interval T, and therefore, it is possible to adopt the reception data D4 in a Q2×L matrix in which no second step is included in the first row. Further, since it is sufficient for each of the rows of the reception data D4 to be the order (the order of the second steps) in which the log data LD is read at the predetermined time interval T, it is possible to adopt a configuration in which the values of the number Q2 of the second steps is not set in advance, but the number Q2 of the second steps is set in accordance with the number of the log data LD. Further, it is possible to adopt a configuration in which the number Q2 of the second steps and the time interval T are individually set for each of the log items.

Further, it is possible to adopt a configuration in which the command data OD is generated based on the setting value file D2 which is changed by the editing unit 60 when the semiconductor wafer production device A is in operation, and then the operation conditions of the same semiconductor wafer production device A in operation are updated. In other words, it is possible to combine the processing of the command data generation unit 20 and the processing of the reception data generation unit 30 with each other to change the operation conditions of the semiconductor wafer production device A in operation in real time.

Due to the configuration described above, it is possible to obtain the log data LD from the plurality of semiconductor wafer production devices A, then generate the reception data D4 for each of the wafers based on the log data LD, and then store the reception data D4.

Further, due to the configuration described above, it is possible to realize the semiconductor production line capable of performing data management taking the state of the wafers and the temporal change of each of the devices A into consideration. As an example, when the thickness of the wafer is equal to or larger than a predetermined value out of one reception data D4, it is sufficient to increase the surface plate rotational speed, the head rotational speed, and the head pressurizing force in the setting value file D2 corresponding to the semiconductor wafer production device (the single-sided polishing apparatus) A which will subsequently operate.

Second Embodiment

The configurations of the control device 100 and each of the data are hereinabove described. Subsequently, a control system S according to a second embodiment will be described. The control system S according to the second embodiment is a configuration provided with a control device 200 including a command data generation unit 120, a reception data generation unit 130, and communication units 150 (150*a* through 150*c*), and a storage unit 210. In other words, the storage unit 10 in the first embodiment is different in configuration from the storage unit 210 in the second embodiment. The difference from the first embodiment will hereinafter be described.

The storage unit 210 related to the present embodiment is disposed in a server 300 separated from the control device 200 as shown in FIG. 6 as an example. A communication unit 190 of the control device 200 and a communication unit 290 of the server 300 have a function of performing predetermined communication (transmission or reception of data) via a network NW.

The server 300 related to the present embodiment is realized by an information processing device such as a personal computer or a workstation as an example. In other words, the server 300 is configured including a CPU, a memory such as a RAM or a ROM, and a communication unit, and operates based on a program set in advance, and an external input.

It should be noted that the network NW is a network having any configuration for coupling the control device 200 and the server 300 to each other, and may be any one of a wireless network, a dedicated line network, and a public line network.

The control system S according to the second embodiment is substantially the same as that of the first embodiment except the configuration in which the storage unit 210 is provided to the server 300, and the communication units 190, 290 perform the predetermined communication via the network NW. Specifically, the command data generation unit 20 is replaced with the command data generation unit 120, the reception data generation unit 30 is replaced with the reception data generation unit 130, the temporal storage unit 40 is replaced with a temporal storage unit 140, the communication unit 50 is replaced with the communication unit 150, the editing unit 60 (the display unit 60*a*, the operation unit 60*b*) is replaced with an editing unit 160 (a display unit 160*a*, an operation unit 160*b*), the communication units 70 (70*a* through 70*c*) are replaced with the communication units 170 (170*a* through 170*c*), and the control units 80 (80*a* through 80*c*) are replaced with the control units 180 (180*a* through 180*c*).

Third Embodiment

Subsequently, the control device 100 according to a third embodiment will be described. In the control device 100 according to the third embodiment, the first configuration file D1 and the second configuration file D3 are configurations encrypted with predetermined encryption processing. The difference from the first embodiment will hereinafter be described.

The first configuration file D1 and the second configuration file D3 related to the present embodiment are encrypted with a known encryption method. Specifically, character strings of the data D11, D12, D13, D14, D31, D32, and D33 in the hierarchies are configured as encrypted texts. As an example, it is possible to adopt a configuration in which the first configuration file D1 and the second configuration file D3 are encrypted with a symmetric-key cryptography method using a cryptographic algorithm such as DES (Data Encryption Standard), RC4 (Rivest Cipher 4), or AES (Advanced Encryption Standard). Further, as another example, it is possible to adopt a configuration in which the first configuration file D1 and the second configuration file D3 are encrypted with a public-key cryptography method using a cryptographic algorithm such as RSA. As still another example, it is possible to adopt a configuration in which the first configuration file D1 and the second configuration file D3 are encrypted with a hybrid cryptography method.

According to the configuration described above, it is possible to prevent a problem caused by casually changing the files D1, D3. Further, it is possible to prevent an information leakage of the files D1, D3.

Figure 7:
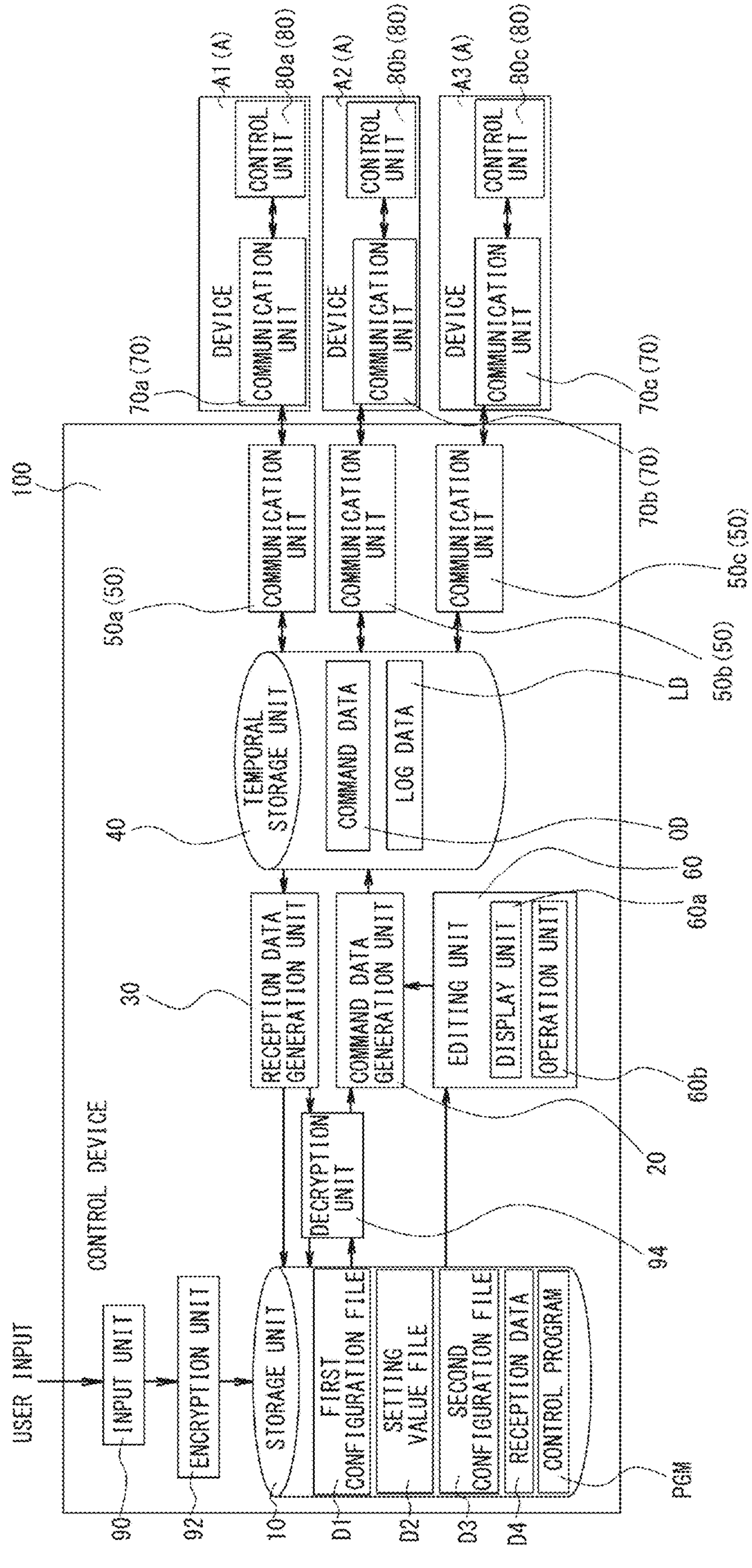
FIG. 7 is a block diagram of a control device according to a third embodiment of the invention.

Since the first configuration file D1 and the second configuration file D3 are encrypted, it is possible for the control device 100 according to the third embodiment to have a configuration in which an input unit 90, an encryption unit 92, and a decryption unit 94 are provided as shown in FIG. 7.

The encryption unit 92 related to the present embodiment is a configuration which corresponds to a CPU, and which invokes the control program PGM from the storage unit 10 to encrypt the first configuration file D1 and the second configuration file D3 input to the input unit 90 with the known cryptography method described above. More specifically, when adopting the symmetric-key cryptography method, the control program PGM has a configuration including an encryption key (common to a decryption key) for encrypting and decrypting the first configuration file D1 and the second configuration file D3 in the program code.

It should be noted that the encryption key and the decryption key are not limited to the configuration of being included in the program code of the control program PGM, but may be data independent of the program code.

Further, the encryption key and the decryption key may be common to the first configuration file D1 and the second configuration file D3, or may be disposed separately from each other.

It should be noted that the input unit 90 related to the present embodiment is a USB port 90 as an example. There is adopted a configuration in which the first configuration file D1 and the second configuration file D3 are input from a USB flash memory or an external terminal to the storage unit 10 via the USB port 90.

It should be noted that the input unit 90 is not limited to the USB port 90. As another example, it is possible to adopt a configuration in which the first configuration file D1 and the second configuration file D3 are input to the storage unit 10 via a communication unit (not shown) instead of the USB port 90. The communication unit has a function of performing predetermined communication (transmission or reception of data) between the control device 100 and the external terminal or the like through a wired LAN or a wireless LAN.

According to the configuration described above, since the first configuration file D1 and the second configuration file D3 input to the control device 100 are encrypted and then stored in the storage unit 10, it is possible to enhance the confidentiality of the files D1, D3.

Further, a configuration in which the control device 100 does not include the encryption unit 92 may be adopted, and in such a case, it is possible to adopt a configuration in which the first configuration file D1 and the second configuration file D3 input to the input unit 90 are encrypted in advance with the known cryptography method described above.

The decryption unit 94 related to the present embodiment is a configuration which corresponds to a CPU, and which invokes the control program PGM from the storage unit 10 to decrypt the first configuration file when the command data generation unit 20 generates the command data OD, and decrypt the second configuration file D3 when the reception data generation unit 30 generates the reception data D4.

According to the configuration described above, since the configuration files D1, D3 are decrypted only when generating the command data OD and the reception data D4, it is possible to enhance the confidentiality of the files D1, D3.

It should be noted that it is possible to adopt a configuration in which the control device 100 does not include the decryption unit 94.

Further, it is possible to adopt a configuration in which the encryption unit 92, the decryption unit 94, or the encryption unit 92 and the decryption unit 94 are provided to an external server (not shown). Further, it is possible to adopt a configuration in which the decryption unit 94 is provided to the semiconductor wafer production device A.

Fourth Embodiment

Subsequently, the control system S according to a fourth embodiment will be described. In the control system S according to the fourth embodiment, the first configuration file D1 and the second configuration file D3 are configurations encrypted with the predetermined encryption processing similarly to the third embodiment. Therefore, it is possible to adopt a configuration in which the control device 200 according to the fourth embodiment includes a decryption unit, and the server 300 includes the input unit and an encryption unit (all not shown). It should be noted that the input unit, the encryption unit, and the decryption unit have substantially the same configurations as those of the third embodiment.

According to the configuration described above, it is possible to prevent a problem caused by casually changing the files D1, D3. Further, it is possible to prevent an information leakage of the files D1, D3.

Fifth Embodiment

Figure 8:
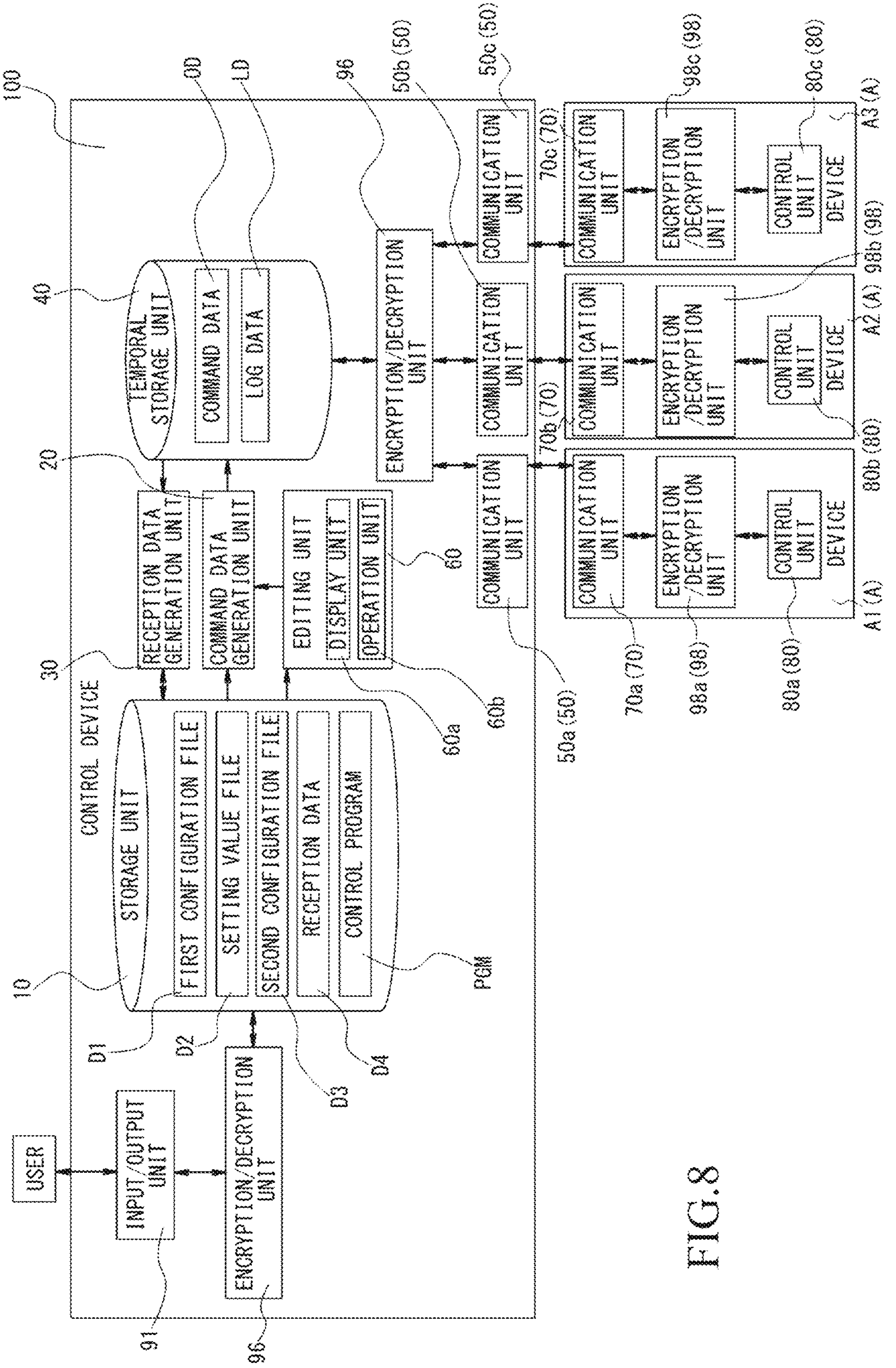
FIG. 8 is a block diagram of a control device according to a fifth embodiment of the invention.
Figure 9:
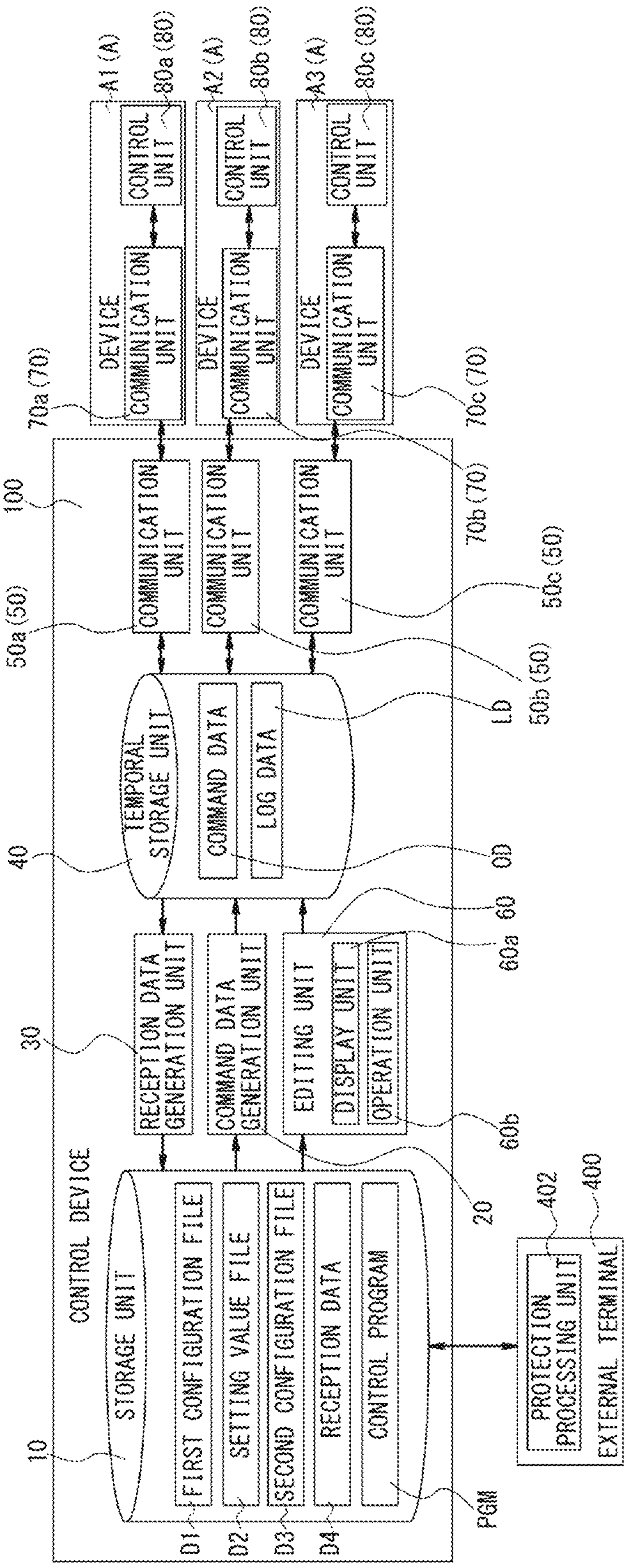
FIG. 9 is a block diagram of a control device according to a seventh embodiment of the invention.

Subsequently, the control device 100 according to a fifth embodiment will be described. In the control device 100 according to the fifth embodiment, there is adopted a configuration in which the first configuration file D1 and the second configuration file D3 are encrypted by predetermined encryption processing when the control device 100 performs the data output to the outside (in particular, a user device such as an external terminal or a USB memory), or performs the data output to the semiconductor wafer production device A. The configuration other than the above is substantially the same as in the first embodiment. Therefore, it is possible for the control device 100 according to the present embodiment to have a configuration including an input/output unit 91, and an encryption/decryption unit 96 as shown in FIG. 8.

It should be noted that the encryption/decryption unit 96 corresponds to a CPU, and includes both the functions of the encryption unit 92 and the decryption unit 94.

According to the configuration described above, in the outside of the control device 100, it is possible to prevent a problem caused by casually changing the first configuration file D1 and the second configuration file D3. Further, it is possible to prevent the information leakage of the files D1, D3, the setting value file D2, and the reception data D4.

Further, it is possible for the semiconductor wafer production devices A (A1 through A3) according to the present embodiment to have configurations respectively including encryption/decryption units 98 (98*a* through 98*c*).

According to the configuration described above, in the outside of the control system including the semiconductor wafer production devices A, it is possible to prevent the problem due to a casual change of the first configuration file D1 and the second configuration file D3 and the information leakage thereof, and at the same time, it is possible to prevent the information leakage of the setting value file D2 and the reception data D4.

Further, it is possible to adopt a configuration in which the control device 100 limits the semiconductor wafer production device A to be the transmission destination and the reception source of data so as not to perform the transmission and the reception of the data with the semiconductor wafer production device A which does not include the encryption/decryption unit 98.

According to the configuration described above, it is possible to prevent the information leakage.

Subsequently, the control system S according to a sixth embodiment will be described. In the control system S according to the present embodiment, there is adopted a configuration in which the first configuration file D1 and the second configuration file D3 are encrypted by predetermined encryption processing when performing the data output to the outside of the control system (in particular, the user device such as the external terminal or the USB memory), when performing the data input/output between the control device 200 and the server 300, and when performing the data output to the semiconductor wafer production device A similarly to the fifth embodiment. The configuration other than the above is substantially the same as in the second embodiment. Therefore, it is possible to adopt a configuration in which the control device 200 and the server 300 according to the sixth embodiment include the input/output unit 91, and the encryption/decryption unit 96 (all not shown).

According to the configuration described above, in the outside of the control system S, it is possible to prevent a problem caused by casually changing the first configuration file D1 and the second configuration file D3. Further, it is possible to prevent the information leakage of the files D1, D3, the setting value file D2, and the reception data D4.

Further, it is possible for the semiconductor wafer production devices A (A1 through A3) to have configurations (not shown) respectively including the encryption/decryption units 98 (98*a* through 98*c*) similarly to the fifth embodiment.

Subsequently, the control device 100 according to a seventh embodiment will be described. In the control device 100 according to the present embodiment, there is adopted a configuration in which predetermined protection processing of inhibiting at least one of deletion and rewriting is performed on the first configuration file D1 and the second configuration file D3 described above. The difference from the first embodiment will hereinafter be described.

The protection processing is performed on the first configuration file D1 and the second configuration file D3 by a protection processing unit 402 corresponding to a CPU in an external terminal 400 as an example. Further, it is possible to adopt a configuration in which a predetermined key is used for releasing the protection.

It should be noted that it is possible to adopt a configuration in which the protection processing unit 402 is provided to the control device 100.

There is adopted a configuration in which the first configuration file D1 and the second configuration file D3 subjected to the protection processing are input to the storage unit 10 of the control device 100 via a communication unit (not shown).

According to the configuration described above, it is possible only for an authorized user to perform the deletion and the edit, and it is possible to prevent a problem caused by changing the first configuration file D1 and the second configuration file D3.

Subsequently, the control system S according to an eighth embodiment will be described. In the control device 200 and the server 300 according to the present embodiment, there is adopted a configuration in which the predetermined protection processing of inhibiting at least one of deletion and rewriting is performed on the first configuration file D1 and the second configuration file D3. The difference from the second embodiment will hereinafter be described.

The protection processing is performed on the first configuration file D1 and the second configuration file D3 by the protection processing unit 402 corresponding to the CPU in the external terminal 400 coupled to the server 300 as an example (all not shown). Further, it is possible to adopt a configuration in which the predetermined key is used for releasing the protection.

It should be noted that it is possible to adopt a configuration in which the protection processing unit 402 is provided to the control device 200 or the server 300.

There is adopted a configuration in which the first configuration file D1 and the second configuration file D3 subjected to the protection processing are input to the storage unit 210 of the server 300 via a communication unit (not shown).

According to the configuration described above, it is possible only for the authorized user to perform the deletion and the edit, and it is possible to prevent a problem caused by changing the first configuration file D1 and the second configuration file D3.

As described hereinabove, according to the control device 100, the control system S, and the control program PGM related to each of the embodiments, it is possible to realize the semiconductor production line capable of performing the data management taking the states of the wafers and the temporal changes in the devices into consideration. In particular, an application to the semiconductor production line in which not only the semiconductor production devices in the anterior process but also the semiconductor production devices in the posterior process are combined with each other is also possible.

It should be noted that the embodiments described hereinabove are not a limitation, and a variety of modifications can be made within the scope or the spirit of the invention.

As an example, it is possible for the first configuration file D1 to have a data structure including the wafer data D12 corresponding to the plurality of semiconductor wafer production devices A. More specifically, it is possible to adopt a data structure in which wafer data related to a measurement device or a detection device in addition to the single-sided polishing apparatus is included in a hierarchy below the summary data D11. Similarly, it is possible for the second configuration file D3 to have a data structure including the wafer data D32 corresponding to the plurality of semiconductor wafer production devices A. More specifically, it is possible to adopt a data structure in which wafer data related to a measurement device or a detection device in addition to the single-sided polishing apparatus is included in a hierarchy below the summary data D31.

Further, as another example, it is possible to adopt a data update unit (not shown) instead of the editing units 60, 160 related to the embodiments. The data update unit is a configuration which compares a predetermined value of the reception data D4 with a threshold value set in advance to update appropriate values set in advance with the setting value file D2.

Further, as another example of the data update unit, there is adopted a configuration of updating the values of the setting value file D2 with predetermined values which can be obtained from correlation data based on predetermined values of the reception data D4 and the correlation data.

What is claimed is:

1. A control device configured to control operations of a plurality of semiconductor wafer production devices for each of target wafers, comprising:

a storage unit; a command data generation unit; a reception data generation unit; and a communication unit, wherein the storage unit stores a first configuration file, a setting value file, and a second configuration file, the first configuration file stores a first identifier of one or more of the plurality of the semiconductor wafer production devices, a second identifier of the wafers, operation items of the semiconductor wafer production device, a number of first steps of the operation items, and transmission destination addresses associated with the operation items and the number of first steps, the setting value file stores an operation recipe which is associated with the first identifier and the second identifier, the operation items, and a respective one of the number of first steps, and which represents an operation condition for each of the semiconductor wafer production devices, or an operation recipe which is associated with the second identifier, the operation items, and a respective one of the number of first steps, and which represents the operation condition for each of the semiconductor wafer production devices, the second configuration file stores the first identifier, the second identifier, log items of the semiconductor wafer production device, a number of second steps of the log items, a predetermined time interval, and reception source addresses associated with the log items, the command data generation unit is configured to associate the transmission destination addresses and the operation recipe with each other to generate command data representing an operation condition of one of the semiconductor wafer production devices which is to operate, or is in operation, and which outputs the command data from the communication unit to the one of the semiconductor wafer production devices, and the reception data generation unit is configured to obtain log data from one of the semiconductor wafer production devices via the communication unit at the predetermined time interval, which associates the log data with the second step in sequence to generate reception data representing at least one of an operation state of the one of the semiconductor wafer production devices in operation, and a state of the wafer, and which stores the reception data in the storage unit.

2. The control device according to claim 1, wherein the first configuration file and the second configuration file are encrypted by predetermined encryption processing.

3. The control device according to claim 1, wherein the first configuration file and the second configuration file are subjected to a predetermined protection processing of inhibiting at least one of deletion and rewriting.

4. A control system configured to control operations of a plurality of semiconductor wafer production devices for each of target wafers, comprising:

a control device including a command data generation unit, a reception data generation unit, and a communication unit; and a storage unit, wherein the storage unit stores a first configuration file, a setting value file, and a second configuration file, the first configuration file stores a first identifier of one or more of the plurality of the semiconductor wafer production devices, a second identifier of the wafers, operation items of the semiconductor wafer production device, a number of first steps of the operation items, and transmission destination addresses associated with the operation items and the number of first steps, the setting value file stores an operation recipe which is associated with the first identifier and the second identifier, the operation items, and a respective number of first steps, and which represents an operation condition for each of the semiconductor wafer production devices, or an operation recipe which is associated with the second identifier, the operation items, and a respective one of the number of first steps, and which represents the operation condition for each of the semiconductor wafer production devices, the second configuration file stores the first identifier, the second identifier, log items of the semiconductor wafer production device, a number of second steps of the log items, a predetermined time interval, and reception source addresses associated with the log items, the command data generation unit is a configuration which associates the transmission destination addresses and the operation recipe with each other to generate command data representing an operation condition of one of the semiconductor wafer production devices which is to operate, or is in operation, and which outputs the command data from the communication unit to the one of the semiconductor wafer production devices, and the reception data generation unit is a configuration which obtains log data from one of the semiconductor wafer production devices via the communication unit at the predetermined time interval, which associates the log data with the second step in sequence to generate reception data representing at least one of an operation state of the one of the semiconductor wafer production devices in operation, and a state of the wafer, and which stores the reception data in the storage unit.

5. The control system according to claim 4, wherein the first configuration file and the second configuration file are encrypted by predetermined encryption processing.

6. The control system according to claim 4, wherein the first configuration file and the second configuration file are subjected to a predetermined protection processing of inhibiting at least one of deletion and rewriting.

7. A non-transitory computer-readable medium storing a control program which, when executed by a computer, causes the computer to control operations of a plurality of semiconductor wafer production devices for each of target wafers, and which is configured to make a computer execute processing comprising:

command data generation processing of associating a first identifier of one or more of the plurality of the number of semiconductor wafer production devices, a second identifier of the wafers, operation items of the semiconductor wafer production device, and transmission destination addresses associated with first steps of the operation items with an operation recipe which is associated with the first identifier and the second identifier, the operation items, and the number of first steps, and which represents an operation condition for each of the semiconductor wafer production devices, or an operation recipe which is associated with the second identifier, the operation items, and the number of first steps, and which represents an operation condition for each of the semiconductor wafer production devices to generate command data representing an operation condition of one of the semiconductor wafer production devices which is to operate or is in operation;

command data output processing of outputting the command data from a communication unit to the one of the semiconductor wafer production devices;

reception data generation processing of obtaining log data at a predetermined time interval from one of the semiconductor wafer production devices via the communication unit, and associating the log data with second steps of log items in sequence to generate reception data representing at least one of an operation state of the one of the semiconductor wafer production devices in operation, and a state of the wafer; and reception data storage processing of storing the reception data in a storage unit.

8. The non-transitory computer-readable medium according to claim 7, wherein the first configuration file and the second configuration file are encrypted by predetermined encryption processing.

9. The non-transitory computer-readable medium according to claim 7, wherein the first configuration file and the second configuration file are subjected to a predetermined protection processing of inhibiting at least one of deletion and rewriting.

* * * * *